United States Patent
Kim

(10) Patent No.: US 10,429,027 B2
(45) Date of Patent: Oct. 1, 2019

(54) LAMP UNIT, AND LIGHTING DEVICE AND VEHICLE LAMP USING SAME

(71) Applicant: LG INNOTEK CO., LTD., Seoul (KR)

(72) Inventor: Ji Hoon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 450 days.

(21) Appl. No.: 15/101,096

(22) PCT Filed: Dec. 2, 2014

(86) PCT No.: PCT/KR2014/011687
§ 371 (c)(1),
(2) Date: Jun. 2, 2016

(87) PCT Pub. No.: WO2015/084016
PCT Pub. Date: Jun. 11, 2015

(65) Prior Publication Data
US 2018/0172234 A1    Jun. 21, 2018

(30) Foreign Application Priority Data

Dec. 2, 2013    (KR) .................. 10-2013-0148506

(51) Int. Cl.
*F21S 45/48* (2018.01)
*F21S 41/141* (2018.01)
(Continued)

(52) U.S. Cl.
CPC ............ *F21S 45/48* (2018.01); *F21S 41/141* (2018.01); *F21S 43/14* (2018.01); *F21S 45/47* (2018.01);
(Continued)

(58) Field of Classification Search
CPC .......... F21S 45/48; F21S 43/14; F21S 41/141; F21S 45/47; F21V 29/70
(Continued)

(56) References Cited

U.S. PATENT DOCUMENTS 5,594,424 A * 1/1997 Louy .................. B60Q 1/2696
340/815.54
6,550,949 B1 * 4/2003 Bauer .................. B60Q 1/0023
362/545

(Continued)

FOREIGN PATENT DOCUMENTS

CN          1776291        5/2006
EP          2112427 A1    10/2009
(Continued)

OTHER PUBLICATIONS

Chinese Office Action dated May 2, 2018 issued in Application No. 201480072598.3 (with English translation).
(Continued)

*Primary Examiner* — Bryon T Gyllstrom
(74) *Attorney, Agent, or Firm* — Ked & Associates, LLP

(57) ABSTRACT

The present invention relates to a lamp unit employing a high-efficiency heat radiation solution for an LED light source, and a lighting device and a vehicle lamp using the same, and the lamp unit comprises an LED light source, a support part for supporting the LED light source, a transfer part facing the LED light source, and a connection part for connecting the support part and the transfer part, wherein the support part, the connection part and the transfer part are provided as thermal conductive members and emit heat of the LED light source to the outside in the form of conduction energy and radiation energy.

20 Claims, 7 Drawing Sheets

(51) Int. Cl.

| | | |
|---|---|---|
| *F21S 43/14* | (2018.01) | |
| *F21S 45/47* | (2018.01) | |
| *F21V 29/70* | (2015.01) | |
| *F21V 29/71* | (2015.01) | |
| *F21V 29/87* | (2015.01) | |
| *F21Y 115/10* | (2016.01) | |
| *B60Q 1/04* | (2006.01) | |

(52) U.S. Cl.
CPC ............ *F21V 29/70* (2015.01); *F21V 29/717* (2015.01); *F21V 29/87* (2015.01); *B60Q 1/0433* (2013.01); *F21Y 2115/10* (2016.08); *H01R 2201/26* (2013.01)

(58) Field of Classification Search
USPC ........................................................ 362/547
See application file for complete search history.

(56) References Cited

U.S. PATENT DOCUMENTS

| | | | |
|---|---|---|---|
| 7,300,191 B2 * | 11/2007 | Oshio | B60Q 1/0005 |
| | | | 362/545 |
| 7,683,395 B2 * | 3/2010 | Huber | F21S 45/47 |
| | | | 257/99 |
| 8,348,484 B2 | 1/2013 | Chaterlea et al. | |
| 8,998,458 B2 | 4/2015 | Tankala et al. | |
| 2002/0159273 A1 * | 10/2002 | Erion | F21S 45/33 |
| | | | 362/547 |
| 2005/0018446 A1 * | 1/2005 | Ishida | F21V 5/04 |
| | | | 362/545 |
| 2006/0291226 A1 * | 12/2006 | Daicho | B82Y 20/00 |
| | | | 362/509 |
| 2009/0262550 A1 | 10/2009 | Inoue | |
| 2010/0214799 A1 * | 8/2010 | Ohmi | B60Q 1/2696 |
| | | | 362/545 |
| 2010/0265717 A1 * | 10/2010 | Luettgens | F21V 29/006 |
| | | | 362/294 |
| 2017/0138557 A1 * | 5/2017 | Henige | F21S 43/15 |

FOREIGN PATENT DOCUMENTS

| | | |
|---|---|---|
| JP | 2006-294263 A | 10/2006 |
| JP | 2007-073369 | 3/2007 |
| JP | 2008-047384 A | 2/2008 |
| JP | 2009-187707 | 8/2009 |
| JP | 2012-171566 A | 9/2012 |
| KR | 10-2011-0021474 A | 3/2011 |
| KR | 10-1061409 B1 | 9/2011 |
| KR | 10-2012-0076197 | 7/2012 |
| KR | 10-1162268 B1 | 7/2012 |
| KR | 10-1231220 B1 | 2/2013 |
| KR | 10-2013-0026263 A | 3/2013 |
| WO | WO 2012/164506 | 12/2012 |

OTHER PUBLICATIONS

International Search Report dated Mar. 31, 2015 issued in Application No. PCT/KR2014/011687.

* cited by examiner

[Fig. 1]
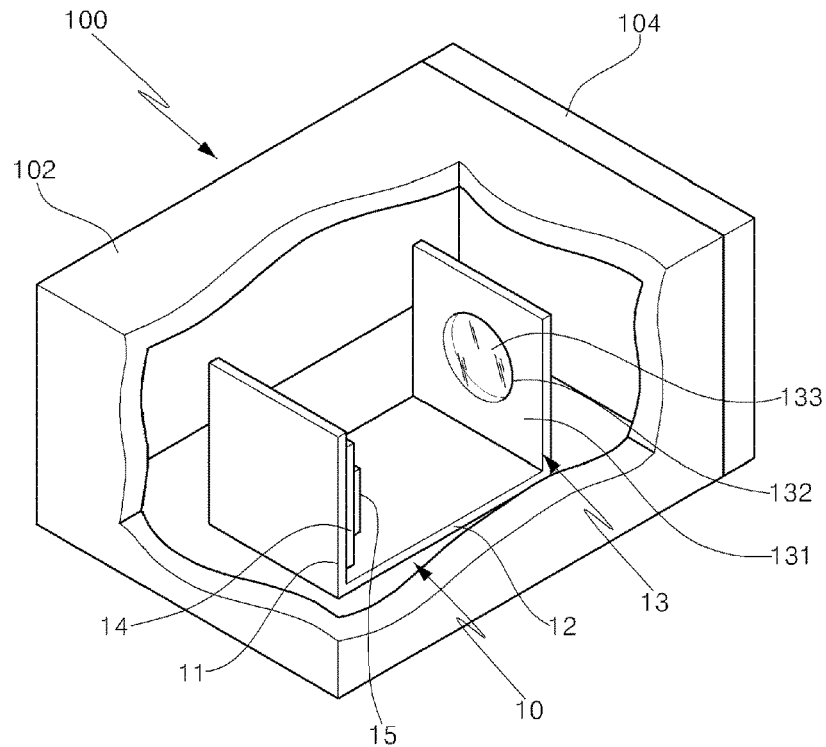
[Fig. 2]
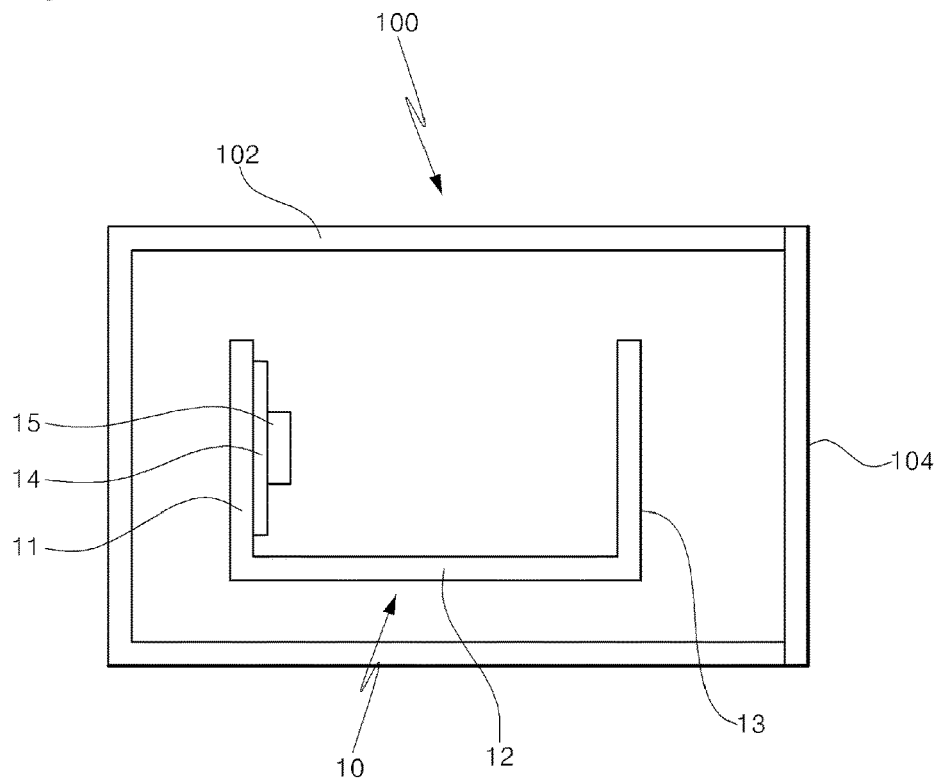

[Fig. 3]
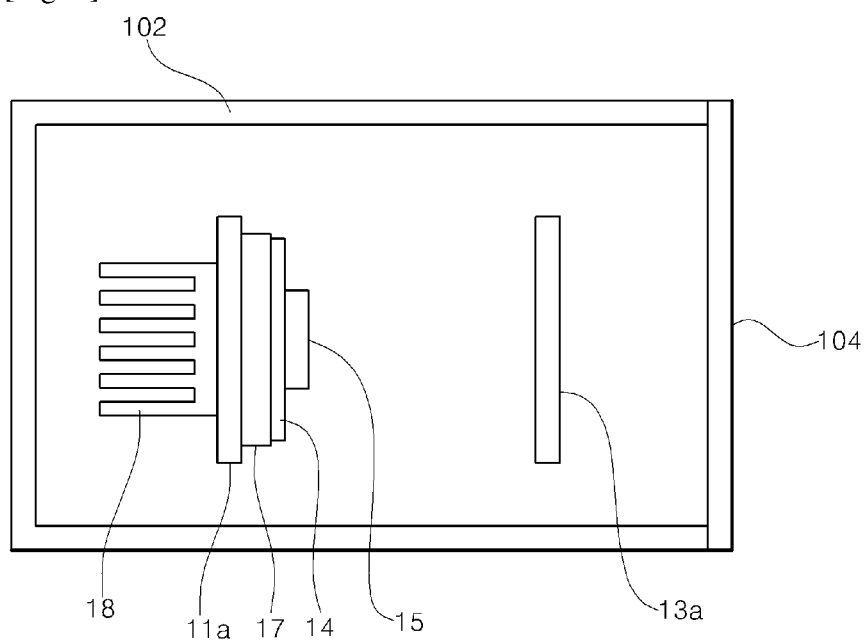
[Fig. 4]
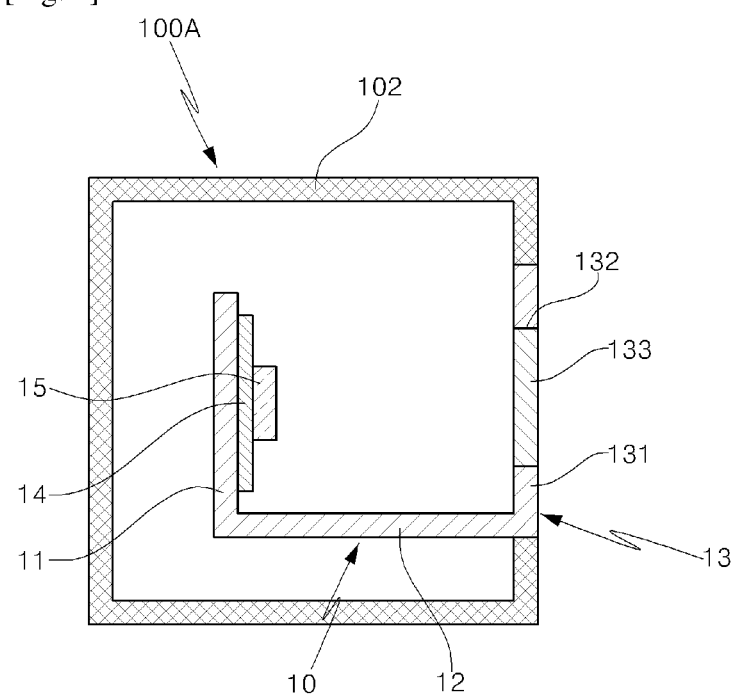

[Fig. 5]
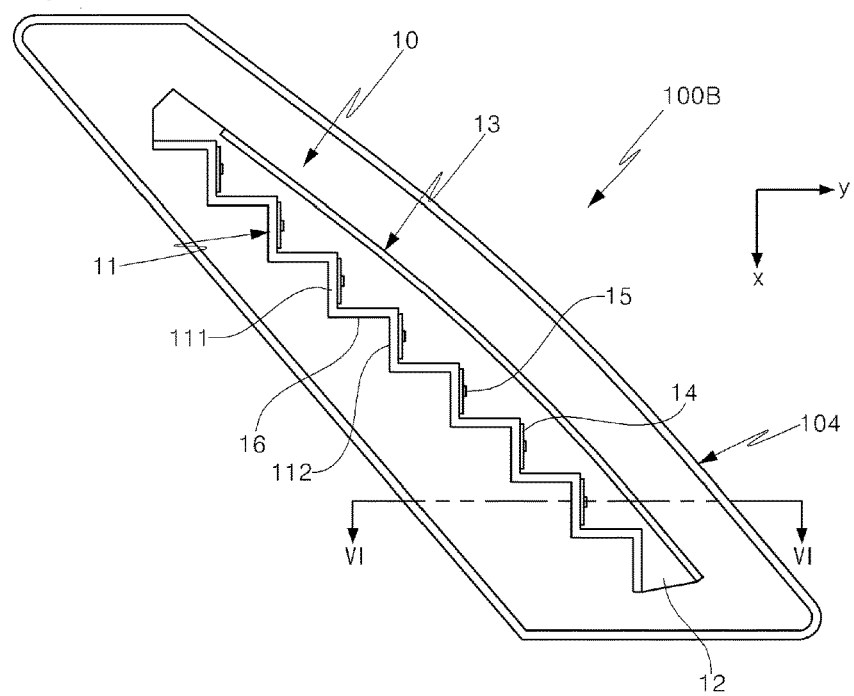
[Fig. 6]
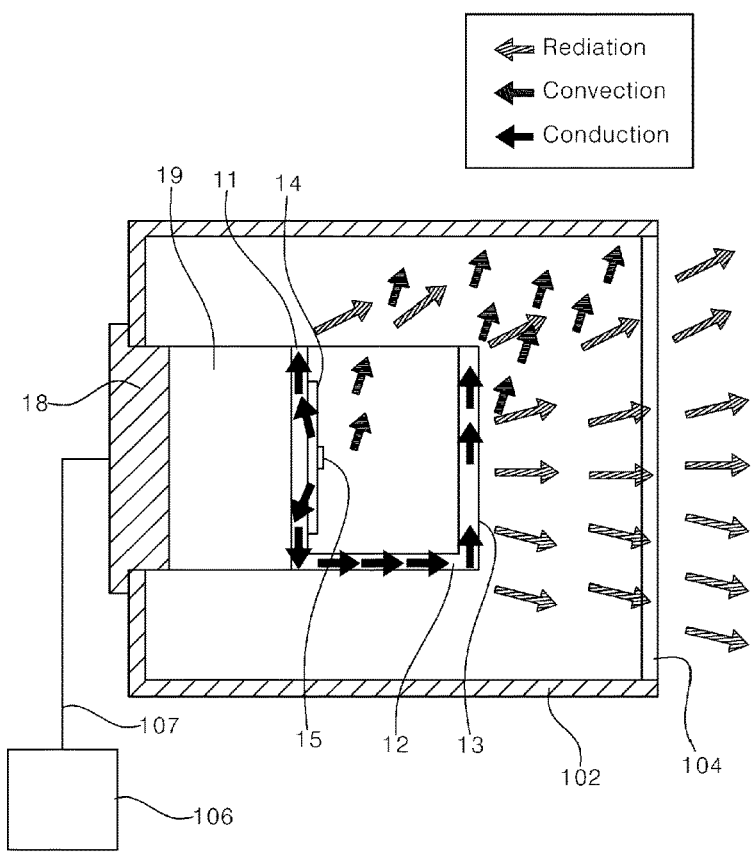

[Fig. 9]
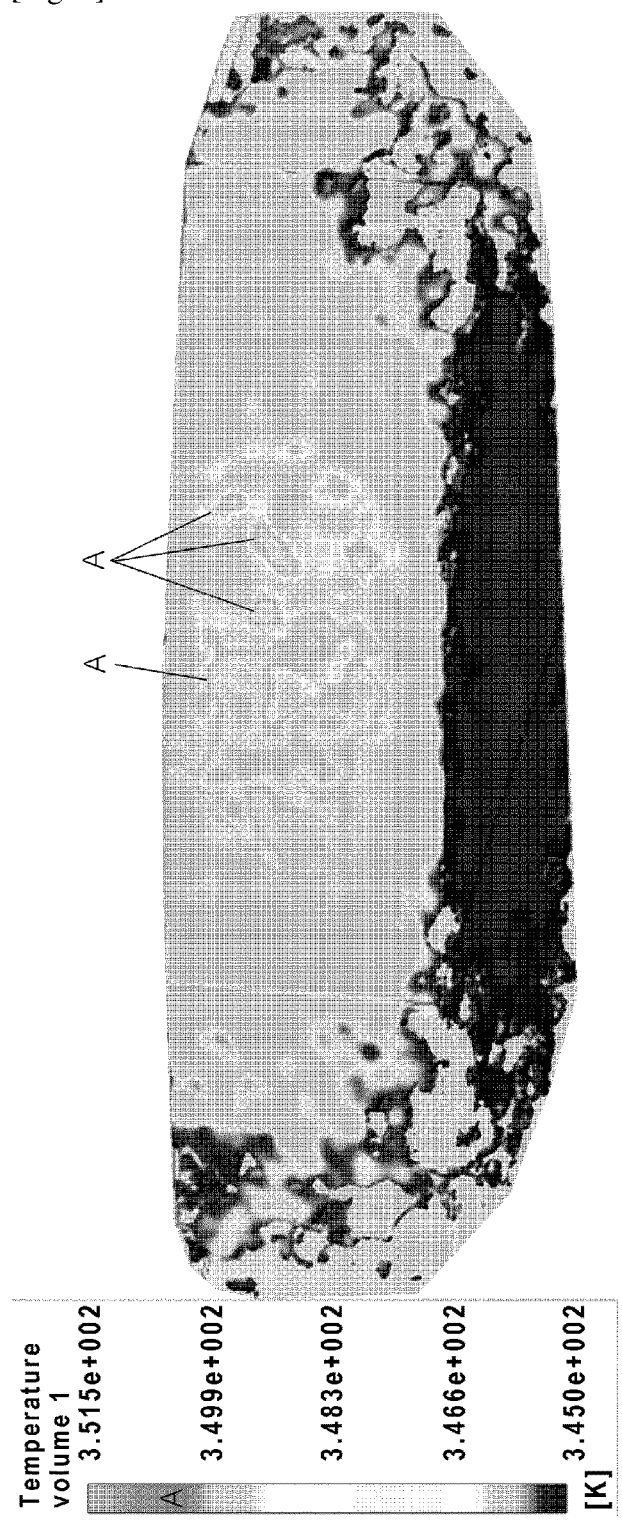

[Fig. 10]
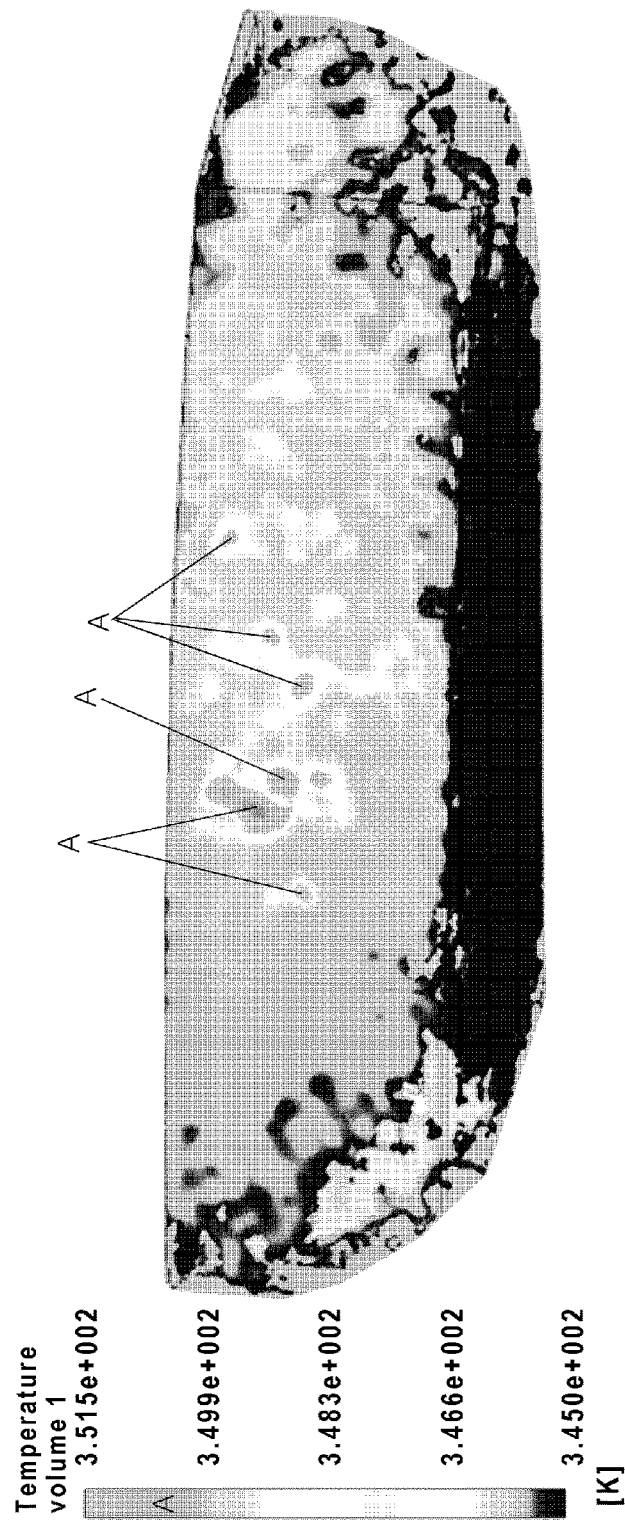

LAMP UNIT, AND LIGHTING DEVICE AND VEHICLE LAMP USING SAME

CROSS-REFERENCE TO RELATED PATENT APPLICATIONS

This application is a U.S. National Stage Application under 35 U.S.C. § 371 of PCT Application No. PCT/KR2014/011687, filed Dec. 2, 2014, which claims priority to Korean Patent Application No. 10-2013-0148506, filed Dec. 2, 2013, whose entire disclosures are hereby incorporated by reference.

TECHNICAL FIELD

Embodiments of the present invention relate to a lamp unit and, more particularly, to a lamp unit employing a high-efficiency heat radiation solution for a light emitting diode (LED) light source, and a lighting apparatus and vehicle lamp using the same.

BACKGROUND ART

Recently, the shape of a vehicle lamp has been diversified for design differentiation. When a light emitting diode (LED) is applied to a vehicle lamp, high efficiency, long life span and lightweight can be obtained but a heat radiation solution for an LED lamp is necessary in order to increase the life span of the LED lamp linked closely to the temperature of an LED chip to a required life span or more.

In order to maintain the LED chip at a predetermined temperature or less, in a conventional vehicle lamp, an aluminum plate and a heat sink are mounted on a rear surface of a printed circuit board (PCB) on which the LED chip is mounted. However, when the aluminum plate and the heat sink are mounted, the vehicle lamp has restrictions in terms of design.

For example, in order to increase heat radiation efficiency of the heat sink, the heat sink requires a heat radiation structure having a fin shape. In addition, a plastic structure (housing, etc.) for assembling the aluminum plate should not interrupt heat radiation of the heat sink when being mechanically fastened with the heat sink.

In addition, the conventional vehicle lamp has inferior heat radiation efficiency because the front surface of an LED module is concealed by a plastic bezel.

DISCLOSURE

Technical Problem

One embodiment of the present invention provides a high-efficiency heat radiation solution for a lamp unit capable of replacing an existing aluminum plate and heat sink for heat radiation of an LED light source. In other words, one embodiment of the present invention provides a lamp unit capable of implementing a high-efficiency heat radiation structure through a heat radiation path of conduction and radiation by omitting the aluminum plate and the heat sink of the existing lamp unit and integrally forming the housing and bezel of the existing lamp unit as a thermally conductive member, a lighting apparatus and vehicle lamp using the same.

Another embodiment of the present invention provides a lamp unit capable of simplifying the structure and manufacturing process of an apparatus by decreasing the number of parts, improving a degree of freedom in design, reducing the weight of the apparatus and decreasing manufacture cost, and a lighting apparatus and vehicle lamp using the same.

Technical Solution

In order to solve the above-described problems, a lamp unit according to an aspect of the present invention includes a light emitting diode (LED) light source, a support part supporting the LED light source, a transfer part facing the LED light source, and a connection part for connecting the support part and the transfer part. The support part, the connection part and the transfer part are provided as a thermally conductive member to emit heat of the LED light source from a lamp housing.

In one embodiment, the thermally conductive member includes thermally conductive polymer or elastomer.

In one embodiment, the transfer unit includes a heat transfer part and a light transfer part, the heat transfer part forms a body of the transfer part, and the light transfer part is provided as an opening of the heat transfer part.

In one embodiment, the light transfer part further includes an optical system inserted into the opening to diffuse, refract or reflect light of the LED light source.

In one embodiment, the lamp unit further includes the lamp housing for housing the LED light source, the support part, the connection part and the transfer part, and an outer lens facing the LED light source and covering an opening of one side of the lamp housing.

A lighting apparatus according to another aspect of the present invention includes a light emitting diode (LED) light source, a support part supporting the LED light source, a transfer part facing the LED light source, a connection part for connecting the support part and the transfer part, a lamp housing for housing the LED light source, the support part, the connection part and the transfer part, and an outer lens facing the LED light source and provided on one surface of the lamp housing. The support part, the connection part and the transfer part are provided as a thermally conductive member to emit heat of the LED light source through the outer lens.

A vehicle lamp according to another aspect of the present invention includes a light emitting diode (LED) light source, a support part supporting the LED light source, a transfer part facing the LED light source, a connection part for connecting the support part and the transfer part, a lamp housing for housing the LED light source, the support part, the connection part and the transfer part, and an outer lens facing the LED light source and provided on one surface of the lamp housing. The support part, the connection part and the transfer part are provided as a thermally conductive member to emit heat of the LED light source through the outer lens through radiation.

In one embodiment, the vehicle lamp further includes a step difference for connecting first and second support regions of the support part. The first support region, the step difference and the second support region are provided in a stepwise shape. The connection part connects one side of the transfer part facing the first support region, the step difference and the second support region having the stepwise shape at one side of the first support region, the step difference and the second support region.

In one embodiment, the transfer unit may include a heat transfer part and a light transfer part. The heat transfer part may form a body of the transfer part, and the light transfer part may include at least one opening facing a first LED light source in the first support region and a second LED light source in the second support region. The light transfer part may further include at least one optical system inserted into the at least one opening to diffuse, refract or reflect light of the LED light source.

In one embodiment, the outer lens may have curvature to fit a curved surface of a vehicle body. The outer lens may be the transfer part provided on one surface of the lamp housing. The light source may receive a voltage from a vehicle battery and operates.

Advantageous Effects

According to the present invention, it is possible to provide a high-efficiency heat radiation solution for a lamp unit capable of replacing an existing aluminum plate and heat sink for heat radiation of an LED light source. In other words, according to the present invention, it is possible to provide a lamp unit capable of implementing a high-efficiency heat radiation structure through a heat radiation path of conduction and radiation by omitting the aluminum plate and the heat sink of the existing lamp unit and integrally forming the housing and bezel of the existing lamp unit as a thermally conductive member, a lighting apparatus and vehicle lamp using the same.

In addition, according to the present invention, it is possible to provide a lamp unit capable of simplifying the structure and manufacturing process of an apparatus by decreasing the number of parts, improving a degree of freedom in design, reducing weight of the apparatus and decreasing manufacture cost, and a lighting apparatus and vehicle lamp using the same.

DESCRIPTION OF DRAWINGS

FIG. 1 is a partial perspective view of a lighting apparatus using a lamp unit according to an embodiment of the present invention.

FIG. 2 is a cross-sectional view of the lighting apparatus of FIG. 1.

FIG. 3 is a cross-sectional view of a lighting apparatus according to a comparison example.

FIG. 4 is a cross-sectional view of a lighting apparatus according to another embodiment of the present invention.

FIG. 5 is a front view of a vehicle lamp according to an embodiment of the present invention.

FIG. 6 is a schematic cross-sectional view illustrating the principle of a heat radiation solution of the vehicle lamp of FIG. 5.

FIG. 9 is a view illustrating a simulation result of the surface temperature distribution of the outer lens of the vehicle lamp of FIG. 5.

FIG. 10 is a view illustrating a simulation result of the surface temperature distribution of the outer lens of the vehicle lamp according to a comparison example.

BEST MODE

Figure 7:
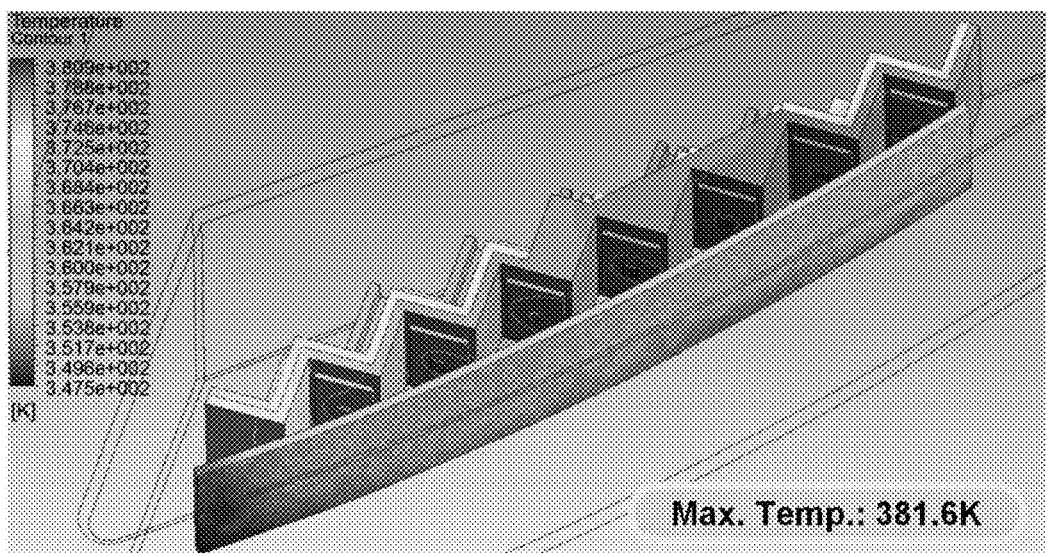
FIG. 7 is a view illustrating a simulation result of the temperature of the internal part of the vehicle lamp of FIG. 5.

Hereinafter, the embodiments of the present invention will be described in detail with reference to the accompanying drawings so as to be easily implemented by those skilled in the art. Those skilled in the art will appreciate that the embodiments disclosed in this specification and the configurations shown in the drawings are merely exemplary and various equivalents and modifications are possible. In describing the principles of the preferred embodiments of the present invention in detail, if it is determined that the detailed description of a related known function or construction renders the scope of the present invention unnecessarily ambiguous, the detailed description thereof will be omitted. The below-described terms are defined in consideration of the functions in the present invention and the meanings of the terms should be interpreted based on the description of the present specification. The same reference numbers are used throughout this specification to refer to the same or like parts.

FIG. 1 is a partial perspective view of a lighting apparatus using a lamp unit according to an embodiment of the present invention, and FIG. 2 is a cross-sectional view of the lighting apparatus of FIG. 1.

Referring to FIGS. 1 and 2, the lighting apparatus 100 according to the present embodiment includes a lamp unit 10 capable of maintaining an LED device 15 at a predetermined temperature or less by integrally forming a housing supporting the LED device 15 or a printed circuit board 14, on which the LED device 15 is mounted, and a bezel provided on a front surface (exit surface) of the LED device 15. The LED device 15 and the printed circuit board 14 may be referred to as an LED light source.

Here, the term "housing" refers to an existing component (e.g., an LED light source housing) supporting an LED light source and corresponds to a "support part" of the present embodiment. The term "bezel" refers to an existing component for preventing hotspot due to the LED light source by concealing the front surface of the LED light source and corresponds to a "transfer part" of the present embodiment.

In other words, the lighting apparatus 100 according to the present embodiment can maintain the LED device at a predetermined temperature or less through a heat radiation path of conduction and radiation by integrally forming the housing and bezel of an existing LED light source as a thermally conductive member.

More specifically, the lighting apparatus 100 includes a lamp unit 10, a lamp housing 102 and an outer lens 104.

The lamp unit 10 includes a support part 11, a connection part 12, a transfer part 13, a printed circuit board 14 and an LED device 15.

The support part 11 supports the printed circuit board 14 on which the LED device 15 is mounted. The support part 11 may be provided substantially in parallel to the exit surface of the LED device 15 mounted on the printed circuit board 14. Of course, the support part 11 may be provided substantially perpendicular to the exit surface of the LED device 15 or in an inclination direction according to type (top emission type, side emission type, etc.) of the LED device 15 or a mounting structure (laid structure). Here, the exit surface may correspond to a surface perpendicular to a direction of light emitted from the LED device 15 or a light emission surface of the LED device 15.

In the present embodiment, the support part 11 is made of a plastic material having high heat radiation property and transfers heat from the LED device 15 or the printed circuit board 14 to the connection part 12 and the transfer part 13 through conduction and emits heat from the LED device 15 or the printed circuit board 14 through convection and radiation.

The connection part 13 connects the support part 11 and the transfer part 13. The connection part 12 is made of a plastic material having high heat radiation property to transfer heat from the support part 12 to the transfer part 13 and emits heat from the support part 12 through convection and radiation.

The transfer part 13 is connected to the support part 11 through the connection part 12 to face the exit surface of the LED device 15. The transfer part 13 may be closer to the outer lens 104 than the LED device 15. In this case, the radiation energy of the transfer part 13 passes through the outer lens 104 to be more efficiently emitted.

In addition, in the present embodiment, the transfer part 13 may include a heat transfer part 131 and a light transfer part 133.

In this case, the heat transfer part 131 forms the body of the transfer part 13 and is a means for applying aesthetic sensibility to the lighting apparatus or a component for performing a function corresponding to the means. The heat transfer part 131 is made of a plastic material having high heat radiation property to emit heat from the LED device 15, the printed circuit board 14, the support part 11 and the connection part 12 through radiation.

The light transfer part 132 is a means for diffusing, refracting or reflecting light from the LED device 15 or a component for performing a function corresponding to the means. The light transfer part 132 may include at least one opening provided in the heat transfer part 131. In this case, the light transfer part 132 may diffuse, refract or reflect light from the LED device 15 by appropriately restricting the size or diameter of the opening.

In addition, the heat transfer part 132 may further include an optical system 133 inserted into or covering the opening. In this case, the optical system 13 may have a single-layer structure (film or plate) having predetermined transmissivity (about 80% or more) and a predetermined refractive index for diffusion, refraction or reflection of light, a double-layer structure having different refractive indices or a structure including a predetermined optical pattern (concave-convex pattern, etc.).

The support part 11, the connection part 12 and the transfer part 13 may be integrally formed as an injection-molded thermally conductive member. The thermally conductive member may be obtained by immersing a thermally conductive filler such as carbon or graphite in thermoplastic resin.

The printed circuit board 14 may include a pad part on which the LED device 15 is mounted, a wire part for connecting the pad part and a driving circuit, an insulation part for restricting or separating the pad part and the wire part, and a base part supporting the pad part, the wire part and the insulation part. In addition, the printed circuit board 14 may include a driving circuit or driving integrated circuit (IC) for driving the LED device 15. In this case, a commercial power source or a vehicle battery may supply voltage to the LED device 15.

In the present embodiment, the printed circuit board 14 may be implemented as a ceramic PCB or a metal PCB in order to efficiently collect heat of the LED device 15 to transfer heat to the support part 11. The metal PCB may be implemented by providing an insulation layer (epoxy resin, etc.) on a metal base substrate using a silicon steel plate, a galvanized steel sheet or an aluminum disc and forming a pad part and a wire part using a conductive layer (copper foil, etc.) provided on the insulation layer. The ceramic PCB is implemented by forming a circuit pattern on a ceramic substrate similarly to the metal PCB.

The LED device 15 is a semiconductor device for emitting light when a forward voltage is applied thereto. The LED device 15 may include an LED chip and emit light having a color which varies according to a material used. The LED device 15 may include a plurality of LED chips according to type or size of the lamp unit.

The lamp housing 102 is a means for housing the lamp unit 10 or a component for performing a function corresponding to the means. The lamp housing 102 may be a concave portion of a building wall, a ceiling, furniture, a vehicle body, etc. or a structure buried in such a concave portion.

In the present embodiment, the lamp housing 102 may have a structure for preventing internal light from leaking therefrom or preventing external moisture from permeating thereinto. That is, the lamp housing 102 may have an enclosed structure.

The outer lens 104 is a means forming the appearance of the exit surface of the lamp unit 100 or a component for performing a function corresponding to the means. The outer lens 104 has transparency such that the inside of the lamp housing 102 is visible. For example, in the vehicle lamp, the outer lens 104 may include a transparent lens or a cover lens plated with chrome. The outer lens 104 is transparent such that radiation energy of the transfer part 13 passes through the outer lens 104 to be emitted.

A conventional lighting apparatus having a structure similar to that of the lighting apparatus of the present embodiment is shown in FIG. 3. FIG. 3 is a cross-sectional view of a lighting apparatus according to a comparison example.

Referring to FIG. 3, the lighting apparatus according to the comparison example includes a housing 11a (corresponding to an LED light source housing), a bezel 13a, a printed circuit board 14, an LED device 15, an aluminum plate 17, a heat sink, a lamp housing 102 and an outer lens 104. The housing 11a supports the printed circuit board 14, on which the LED device 15 is mounted, with the aluminum plate 17 interposed therebetween, and the heat sink 18 has a fin structure such that the heat sink penetrates through the housing 11a to be in contact with the aluminum plate 17 and emits heat from the LED device 15.

When the lamp housing 102 has an enclosed structure, the heat sink 18 is provided to be exposed to the outside of the lamp housing 102 or to emit internal heat of the lamp housing through a separate refrigerant circuit. That is, when a refrigerant circuit connected to a vehicle cooling apparatus is used, the heat radiation solution of the lighting apparatus according to the comparison example increases the number of parts and has a complicated structure, a complicated manufacturing process and high cost.

However, according to the present embodiment described with reference to FIGS. 1 and 2, in the lamp unit 10 provided in a space enclosed by the lamp housing 102, a separate aluminum plate or heat sink for heat radiation of the LED device 15 is not added and a heat radiation path of conduction, convection, emissivity and radiation is formed by the support part 11, the connection part 12 and the transfer part 13 formed integrally using the thermally conductive member such that the LED device 15 is efficiently maintained at a predetermined temperature or less in the lighting apparatus (vehicle lamp, etc.).

As described above, according to the present embodiment, it is possible to simplify the structure and manufacturing process of the apparatus by omitting the existing aluminum plate and heat sink while implementing the heat radiation solution by a new heat radiation path, to improve a degree of freedom in design of the apparatus, and to minimize the weight of the apparatus.

In addition, according to the present embodiment, since the LED device 15 can be efficiently maintained at the predetermined temperature or less, it is possible to efficiently prevent luminous efficacy and life span of the LED device from being adversely affected due to undesired change of forward current.

In addition, according to the present embodiment, a fogging problem generated on the outer surface of the outer lens of the lighting apparatus 100 can be solved by radiant heat of the lamp unit 10. That is, in the existing vehicle lamp, visible fogging is generated on the outer surface of the outer lens according to internal and external temperature change of the lamp. However, according to the present embodiment, such a fogging problem can be solved. In addition, in the conventional technology, a coating layer for preventing fogging may be formed in order to solve the fogging problem. However, in this case, cost increases due to high cost required for the coating process. However, according to the present embodiment, the coating layer for preventing fogging can be omitted.

FIG. 4 is a cross-sectional view of a lighting apparatus according to another embodiment of the present invention.

Referring to FIG. 4, the lighting apparatus 100A according to the present embodiment includes a support part 11, a connection part 12, a transfer part 13, a printed circuit board 14, an LED device 15 and a lamp housing 102. The transfer part 13 includes a heat transfer part 131 and a light transfer part 132. The light transfer part 132 includes an optical system 133.

In the present embodiment, the transfer part 13 includes the heat transfer part 131 provided to restrict the internal space of the lamp housing 102 on one surface of the lamp housing 102. The heat transfer part 131 may face the support part 11 on one end of the connection part 12.

In addition, the transfer part 13 includes the light transfer part 132 for diffusing, refracting and reflecting light from the LED device 15. The light transfer unit 132 may further include an opening for enabling communication between the inside and outside of the lamp housing 102 by removing the heat transfer part 131 of a predetermined region in the thickness direction of the heat transfer part 131 or an optical system 133 for blocking or covering the opening.

Although the transfer part 13 is shown as replacing a portion of one surface of the lamp housing 102 in the present embodiment, the present invention is not limited thereto and the transfer part 13 may replace at least two surfaces of the lamp housing 102. This configuration may be easily implemented based on the configuration of the present embodiment and a detailed description thereof will be omitted.

According to the present embodiment, the outer lens (see 104 of FIG. 1) is omitted and the transfer part 13 replaces the outer lens. In this case, by decreasing the number of parts of the lighting apparatus, it is possible to simplify the structure and manufacturing process of the apparatus, to reduce the weight of the apparatus, and to decrease cost.

Since the LED device 15 is formed on the substrate, it is difficult for the LED device to have a curved surface. Accordingly, in a general method, a stepwise lighting apparatus is manufactured using a plurality of LED devices having a small size in order to enable the LED device to have a curved surface. However, when the plurality of LED devices is used, as the number of LED devices increases, power consumption increases and the degree of freedom of the vehicle lamp is significantly restricted due to restriction in design change. However, in the present invention, as described with reference to FIG. 5 and subsequent figures thereof, while the plurality of LED devices is used, the number of parts decreases through an efficient heat radiation structure so as to realize weight reduction, cost decrease, improvement of the degree of freedom in design and simplification of an assembly process.

FIG. 5 is a front view of a vehicle lamp according to an embodiment of the present invention.

Referring to FIG. 5, a vehicle lamp 100B according to the present embodiment includes a support part 11, a connection part 12, a transfer part 13, a printed circuit board 14, an LED device 15, a step difference 16, a lamp housing and an outer lens 104.

The support part 11 includes a plurality of support regions arranged in a stepwise shape along the extension direction of a curved lamp housing or a curved outer lens 104. That is, the first support region 111 and second support region 112 of the support part 11 are integrally connected by the step difference 16 and the first support region 111, the step difference 16 and the second support region 112 are formed in a stepwise shape. The step difference 16 may be made of the same material as the support part 11. According to the structure of the support part 11, a plurality of LED devices 15 may be arranged in the plurality of support regions according to the shape of the curved surface of the vehicle lamp 100B.

The connection part 12 connects one side of the support part 11 and one side of the transfer part 13. That is, the connection part 12 is configured to face the first support region 111, the step difference 16 and the second support region 112 at one side of the first support region 111, the step difference 16 and the second support region 112 of the stepwise support part 11 and to connect one side of the transfer part 13 having predetermined curvature.

The transfer part 13 is connected to the support part 11 and the step difference 16 through the connection part 12. The transfer part 13 may have predetermined curvature to face a coupling structure of the support part 11 and the step difference 16 extending in the stepwise shape along the curved surface of the vehicle lamp 110B. The curvature of the transfer part 13 may be similar to that of the curved surface of the vehicle lamp 100B.

The transfer part 13 may include the heat transfer part and the light transfer part and the light transfer part may include an optical system (see FIGS. 1 and 3).

The printed circuit board 14 may include a pad part on which the LED device 15 is mounted, a conductive circuit pattern for connecting the pad part and a driving circuit and an IC chip on which the driving circuit is mounted. The printed circuit board 14 may be adhered to the support part 11 using an adhesive layer such as epoxy resin. The pad part, the driving circuit, the circuit pattern, the IC chip and the adhesive layer are well-known in the technical field of the printed circuit board and thus a description thereof will be omitted.

In addition, the printed circuit board 14 and the LED device 15 may be substantially equal to the printed circuit boards and LED devices of the embodiments described with reference to FIGS. 1, 2 and 4 except that a plurality of LED light sources each including an LED device and a printed circuit board is provided in a plurality of support regions. In addition, the lamp housing and the outer lens 104 may be substantially equal to the lamp housings and outer lenses of the above-described embodiments except that a curved structure is included.

In the present embodiment, light of the LED device 15 may travel substantially in a y direction or in a direction substantially perpendicular to an x-y plane (in a direction from a sheet surface) according to the structure of the transfer part 13 or reflexibility.

According to the structure of the support part 11, the connection part 12 and the transfer part 13, a light mixing region may be provided in an empty space between the support part 11 and the transfer part 13 provided to face each other in both edges of the connection part 12. When such a light mixing region is used, a surface light source can be implemented using a small number of light sources, the amount and intensity of light suitable for a safety criterion of the vehicle lamp can be provided. Therefore, it is possible to improve economic efficiency of the vehicle lamp and the degree of freedom in product design.

FIG. 6 is a schematic cross-sectional view illustrating the principle of a heat radiation solution of the vehicle lamp of FIG. 5. FIG. 6 is a cross-sectional view taken along line VI-VI of the vehicle lamp of FIG. 5 except for a connector, an external wire and a vehicle battery.

Referring to FIG. 6, the vehicle lamp according to the present embodiment includes a lamp unit, a lamp housing 102, an outer lens 104 and a connector 18. The lamp unit includes a support part 11, a connection part 12 and a transfer part 13. The connector 18 refers to a means or component for detachably coupling the lamp unit to the lamp housing 102. The connector 18 is coupled to the lamp unit at the upper end 19 thereof. Here, the support part 11 of the lamp unit is provided between the printed circuit board 14 and the upper end 19 of the connector. The printed circuit board 14 of the lamp unit may be connected to a power supply 106 through the connector 18 and a predetermined external wire 107. The power supply 106 may be a commercial power source or a vehicle battery.

In the present embodiment, when the vehicle lamp operates, most heat generated in the LED device 15 is transferred to the printed circuit board 14 such as a metal PCB through conduction and some heat is transferred to the internal space of the lamp housing 102 through convection.

Most heat of the printed circuit board 14 is transferred to the support part 11 which is in contact with the printed circuit board 14 and is provided as the thermally conductive member, and most heat of the support part 11 is transferred to the transfer part 13 through the connection part 12 through conduction. Most heat of the transfer part 13 passes through the outer lens 104 through radiation to be emitted from the vehicle lamp.

That is, most heat of the printed circuit board 14 is transferred to the thermally conductive member (thermally conductive polymer, etc.) obtained by integrally forming the support part 11, the connection part 12 and the transfer part 13, and passes through the transparent outer lens 104 through radiation generated due to the properties of polymer having high emissivity to be emitted when the temperature of the thermally conductive member increases.

Some heat of the printed circuit board 14, the support part 11, the connection part 12 and the transfer part 13 may be transferred to the internal space of the lamp housing 102 through convection and may be emitted through heat exchange with a relatively-low-temperature part inside the lamp housing 102 (the inner surface of the outer lens or the inner surface of the metal lamp housing).

According to the present embodiment, by using the support part 11, the connection part 12, the transfer part 13 and the step difference 16 integrally formed as the thermally conductive member, heat generated in the plurality of LED devices 15 may be converted into conduction, convection, emissivity and radiation energy in the support part 11, the connection part 12, the transfer part 13 and the step difference 16 to be emitted from the outer lens 104 and dissipated. In addition, according to the present embodiment, it is possible to simplify the structure and manufacturing process of the apparatus through a new heat radiation structure of the lamp unit 10, to improve a degree of freedom in design, and to reduce the weight of the apparatus.

Figure 8:
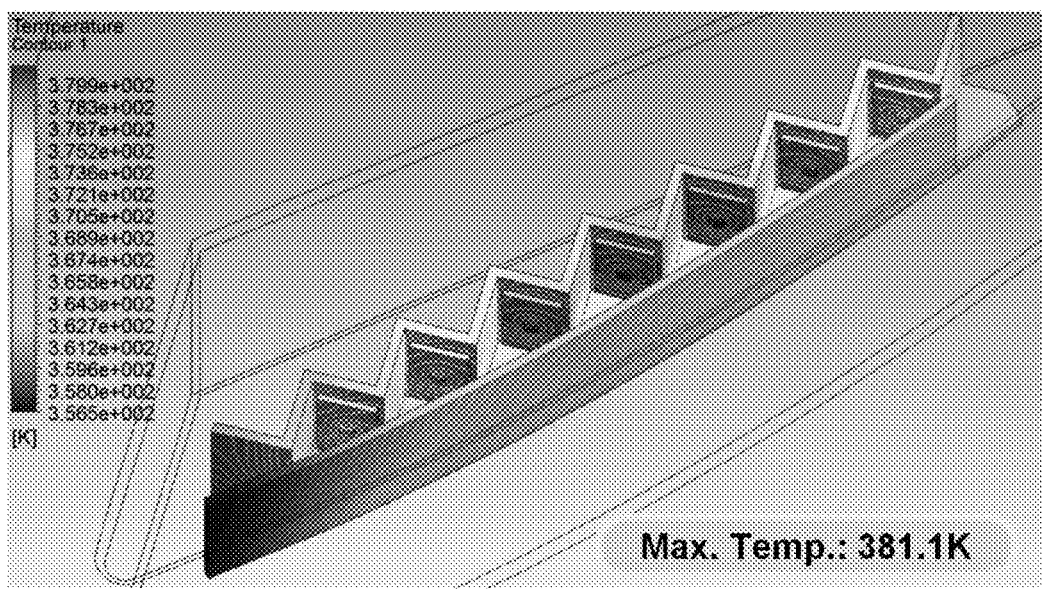
FIG. 8 is a view illustrating a simulation result of the temperature of the internal part of the vehicle lamp according to a comparison example.

FIG. 7 is a view illustrating a simulation result of the temperature of the internal part of the vehicle lamp of FIG. 5. FIG. 8 is a view illustrating a simulation result of the temperature of the internal part of the vehicle lamp according to a comparison example.

Referring to FIG. 7, the maximum temperature of the internal part (corresponding to the lamp unit) of the vehicle lamp according to the present embodiment is about 381.1K. The temperature of the internal part is the temperature of the LED device.

Referring to FIG. 8, the maximum temperature of the internal part of the vehicle lamp according to the comparison example is about 381.6K. The internal part of the comparison example includes the aluminum plate and the aluminum heat sink in addition to the configuration corresponding to the lamp unit of the present embodiment.

The simulation result of the temperature of the internal part of the present embodiment corresponds to the result of removing the aluminum plate and the aluminum heat sink from the internal part of the comparison example and integrally forming the housing and the bezel as thermally conductive polymer. By using the thermally conductive member without the aluminum plate and the heat sink, the LED device can be maintained at a predetermined temperature or less.

In addition, according to the above-described simulation result, by using the thermally conductive member having higher thermal conductivity, it is possible to efficiently decrease the temperature of the internal part of the vehicle lamp as compared to the existing heat radiation solution using the aluminum plate and the heat sink.

FIG. 9 is a view illustrating a simulation result of the surface temperature distribution of the outer lens of the vehicle lamp of FIG. 5. FIG. 10 is a view illustrating a simulation result of the surface temperature distribution of the outer lens of the vehicle lamp according to the comparison example.

Referring to FIGS. 9 and 10, it can be seen that a first region of a relatively high temperature denoted by "A" in the surface temperature distribution of the outer lens of the present embodiment (FIG. 9) is wider than a second region of a relatively high temperature denoted by "A" in the surface temperature distribution of the outer lens of the comparison example (FIG. 10). The area of the first region is appropriately 10 to several tens of times that of the second region.

The above-described simulation result shows that heat of the LED device can be efficiently emitted from the outer lens due to the radiation effect of the transfer part by the heat radiation path of the support part, the connection part and the transfer part of the present embodiment.

According to the present embodiment, by using the heat radiation path through conduction and radiation in order of the printed circuit board, the support part, the connection part and the transfer part, it is possible to eliminate snow and frost on the surface of the outer lens and to prevent scattering of light due to snow or frost.

The lighting apparatuses and vehicle lamps according to the above-described embodiments are applicable to various apparatuses requiring lighting. For example, the lighting apparatus is applicable to home lighting apparatuses, industrial lighting apparatuses, lighting apparatuses for public facilities, etc. and the vehicle lamp is applicable to a headlight, a fog lamp, a vehicle interior lamp, a kick plate, and a rear light (or rear combination lamp).

Although the preferred embodiments of the present invention are described and shown, it will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

The invention claimed is:

1. A lamp unit comprising:
a light emitting diode (LED) light source including a printed circuit board and a LED device disposed on a first surface of the printed circuit board;
a support part provided to support the LED light source;
a transfer part provided to face the LED light source; and
a connection part provided between a first edge of the support part and a first edge of the transfer part,
wherein the support part is bent in a vertical direction from a first edge of the connection part,
wherein the transfer part is bent to face the support part from a second edge of the connection part,
wherein the support part and the transfer part are formed of a same material as the connection part,
wherein the first surface of the printed circuit board is overlapped with the transfer part and support part in a horizontal direction orthogonal to the vertical direction,
wherein a first end of the printed circuit board faces a first surface of the connection part and is spaced apart from the first surface of the connection part,
wherein the transfer part includes an opening facing an emitting surface of the LED device and a light transfer part disposed on the opening penetrating a body of the transfer part,
wherein the light transfer part of the transfer part transmits light generated from the LED device, and
wherein the support part, the connection part, and the transfer part combine to form a thermally conductive frame, and heat of the LED light source is transferred by conduction to the support part, the connection part, and the transfer part and by convection from the thermally conductive frame.

2. The lamp unit according to claim 1, wherein the thermally conductive frame includes thermally conductive polymer or elastomer.

3. The lamp unit according to claim 1, wherein the light transfer part further includes an optical element inserted into the opening of the light transfer part to at least one of diffuse, refract or reflect light of the LED device, and
wherein the connection part extends from the support part in an outward direction of one side of the LED light source.

4. The lamp unit according to claim 1, further comprising:
a lamp housing that receives the LED light source, the support part, the connection part and the transfer part; and
an outer lens facing the LED light source and covering an opening of one side of the lamp housing.

5. The lamp unit according to claim 1, further comprising:
a lamp housing that receives the LED light source, the support part, the connection part, and the transfer part, wherein the transfer part is exposed on one surface of the lamp housing.

6. The lamp unit according to claim 1, further comprising:
an outer lens facing the transfer part,
wherein the heat of the transfer part is emitted through the outer lens by radiation.

7. The lamp unit according to claim 1, wherein the support part includes a first support region and a second support region which are stepped by a step difference,
wherein the step difference is provided to connect the first and second support regions,
wherein the LED light source includes a first LED light source disposed on a first surface of the first support region and a second LED light source disposed on a second surface of the second support region,
wherein the first support region, the step difference, and the second support region are provided in a stepwise shape,
wherein the connection part extends from first edges of the first support region, the step difference, and the second support region toward the first edge of the transfer part,
wherein each of the first support region, the step difference and the second support region face the transfer part,
wherein the transfer part has a curved surface to face the outer lens,
wherein the transfer part has a curved surface to face the first LED light source and the second LED light source, and
wherein the support part, the connection part and the transfer part are formed of a plastic material.

8. A lighting apparatus comprising:
a light emitting diode (LED) light source including a printed circuit board and a LED device disposed on a first surface of the printed circuit board;
a support part provided to support the LED light source;
a transfer part provided to face the LED light source;
a connection part provided between a first edge of the support part and a lower edge of the transfer part;
a lamp housing provided to receive the LED light source, the support part, the connection part and the transfer part; and
an outer lens facing the LED light source and provided on one surface of the lamp housing,
wherein the support part is bent in a vertical direction from a first edge of the connection part,
wherein the transfer part is bent to face the support part from a second edge of the connection part,
wherein the support part and the transfer part are formed of a same material as the connection part,
wherein the first surface of the printed circuit board is overlapped with the transfer part and support part in a horizontal direction orthogonal to the vertical direction,
wherein a first end of the printed circuit board faces a first surface of the connection part and is spaced apart from the first surface of the connection part,
wherein the transfer part includes an opening facing an emitting surface of the LED device and a light transfer part disposed on the opening penetrating a body of the transfer part,
wherein the light transfer part of the transfer part transmits light generated from the LED device,
wherein the support part, the connection part, and the transfer part combine to form a thermally conductive frame, and heat of the LED light source is transferred by conduction to the support part, the connection part, and the transfer part and by convection from the thermally conductive frame and through an opening of the lamp housing.

9. The lighting apparatus according to claim 8, wherein the thermally conductive frame includes thermally conductive polymer or elastomer.

10. The lighting apparatus according to claim 8, further comprising a step difference provided to connect first and second support regions of the support part,
wherein the LED light source includes a first LED light source disposed on a first surface of the first support region and a second LED light source disposed on a second surface of the second support region,
wherein the first support region, the step difference, and the second support region are provided in a stepwise shape,
the connection part connects to the first edge of the transfer part and a first edge of the first support region, the step difference, and the second support region, and
wherein each of the first support region, the step difference and the second support region face the transfer part.

11. The lighting apparatus according to claim 10, wherein:
the transfer part includes at least one opening facing the first LED light source on the first support region and the second LED light source on the second support region; and
wherein the support part and the connection part are formed of a plastic material.

12. The lighting apparatus according to claim 11, wherein the transfer part further includes at least one optical element inserted into the at least one opening of the transfer part to at least one of diffuse, refract or reflect light of the LED light source.

13. A vehicle lamp comprising:
a light emitting diode (LED) light source including a printed circuit board and a LED device disposed on a first surface of the printed circuit board;
a support part provided to support the LED light source;
a transfer part provided to face the LED light source;
a connection part that connects a first edge of the support part and a first edge of the transfer part;
a lamp housing provided to receive the LED light source, the support part, the connection part, and the transfer part; and
an outer lens facing the LED light source and provided on one surface of the lamp housing,
wherein the support part is bent in a vertical direction from a first edge of the connection part,
wherein the transfer part is bent to face the support part from a second edge of the connection part,
wherein the support and the transfer part are formed of a same material as the connection part,
wherein the first surface of the printed circuit board is overlapped with the transfer part and support part in a horizontal direction orthogonal to the vertical direction,
wherein a first end of the printed circuit board faces a first surface of the connection part and is spaces apart from the first surface of the connection part,
wherein the transfer part includes an opening facing an emitting surface of the LED device and light transfer part is disposed on the opening penetrating a body of the transfer part,
wherein the light transfer part of the transfer part transmits light generated from the LED device,
wherein the support part, the connection part, and the transfer part combine to form a thermally conductive frame, and heat of the LED light source is transferred by conduction through the thermally conductive frame, through an opening to the lamp housing by convection, and through the outer lens by radiation.

14. The vehicle lamp according to claim 13, wherein the thermally conductive frame includes thermally conductive polymer or elastomer.

15. The vehicle lamp according to claim 13, further comprising a step difference that connects first and second support regions of the support part,
wherein the LED light source includes a first LED light source disposed on a first surface of the first support region ad a second LED light source disposed on a second surface of the second support region,
wherein the first support region, the step difference and the second support region are provided in a stepwise shape,
the connection part connects to the first edge of the transfer part and a first edge of the first support region, the step difference and the second support region, and
wherein each of the first support region, the step difference and the second support region face the transfer part.

16. The vehicle lamp according to claim 15, wherein:
the transfer part includes at least one opening facing the first LED light source on the first support region and the second LED light source on the second support region, and
wherein the support part and the connection part are formed of a plastic material.

17. The vehicle lamp according to claim 16, wherein the transfer part further includes at least one optical element inserted into the at least one opening of the transfer part to at least one of diffuse, refract or reflect light of at least one of the first LED light source or the second LED light source.

18. The vehicle lamp according to claim 13, wherein the outer lens has curvature to fit a curved surface of a vehicle body, and
wherein the transfer part has a curved surface to face the outer lens.

19. The vehicle lamp according to claim 15, wherein the transfer part are exposed on one surface of the lamp housing.

20. The vehicle lamp according to claim 13, wherein the LED light source receives a voltage from a vehicle battery, and
wherein the support part, the connection part and the transfer part are formed of a plastic material.

* * * * *